United States Patent [19]

Commelin et al.

[11] Patent Number: 5,588,801
[45] Date of Patent: Dec. 31, 1996

[54] FLAP STOPS DEVICE WITH RETRACTABLE UPPER STOPS RING, AND ROTOR HEAD INCLUDING IT

[75] Inventors: Sylvie J. Commelin, Carry le Rouet; Jean J. Mondet, Pelissanne, both of France

[73] Assignee: Eurocopter France, Marignane, France

[21] Appl. No.: 539,692

[22] Filed: Oct. 5, 1995

[30] Foreign Application Priority Data

Oct. 12, 1994 [FR] France .................................. 94 12168

[51] Int. Cl.⁶ .................................................. B64C 27/51
[52] U.S. Cl. .................... 416/46; 416/51; 416/53; 416/140
[58] Field of Search .......................... 416/46, 51, 53, 416/134 A, 140

[56] References Cited

U.S. PATENT DOCUMENTS

| 2,549,887 | 4/1951 | Buivid ..................... 416/140 |
| 2,717,653 | 9/1955 | Emmerson . |
| 3,679,322 | 7/1972 | Mouille ..................... 416/140 |
| 4,289,448 | 9/1981 | Declerco et al. ........... 416/46 |
| 4,652,210 | 3/1987 | Leman et al. ............. 416/140 |
| 5,007,799 | 4/1991 | Mouille . |

FOREIGN PATENT DOCUMENTS

| 0360688 | 3/1990 | European Pat. Off. . |
| 2434079 | 3/1980 | France . |
| 2636914 | 3/1992 | France . |
| 2028749 | 3/1980 | United Kingdom . |

*Primary Examiner*—James Larson
*Attorney, Agent, or Firm*—Larson & Taylor

[57] ABSTRACT

The device comprises anti-cone stops projecting outwards from a common ring that can rotate about the rotor axis on the top face of the hub and flyweights are each individually joined to the ring for driving the latter in rotation from the "ground" position, in which each anti-cone stop is facing an upper bearing shoe of the corresponding blade, to the "flight" position, in which the anti-cone stops are retracted, returning them to the "ground" position.

15 Claims, 11 Drawing Sheets

FLAP STOPS DEVICE WITH RETRACTABLE UPPER STOPS RING, AND ROTOR HEAD INCLUDING IT

BACKGROUND OF THE INVENTION

The invention relates to a flap stops device for a main rotor of a rotorcraft such as a helicopter, and deals more particularly with a device with anti-cone stops or upper flap stops which can be retracted in flight, for a main rotor of the hinged type for any helicopter, and in particular for a helicopter of high tonnage, in which each main rotor is equipped with blades of high mass and large dimensions.

The flap stops device according to the invention is more specifically, although not exclusively, intended to equip heavy helicopters, in which the blades of each main rotor have to be able to be folded up, and employed in operating conditions causing them to encounter strong and gusting winds, as is the case with heavy helicopters on board surface ships, on the decks of which the blades of the main rotors have to be manoeuvred in terms of folding up and in terms of deployment, automatically or manually, while the ships are in motion.

In order to limit the angular flap or downwards bending of the flapping masses, each mainly composed of a blade, of a part for attaching the blade to the hub, such as a sleeve, and of various other components necessary for operation, such as pins and pitch levers, on hinged main rotors of helicopters under the effect of the self weight of the flapping masses, at low rotational speeds of the rotors and when the rotors are stationary, the rotor heads are generally equipped with flap stops known as "droop restrainer stops", and many different embodiments of droop restrainer stops devices have already been proposed.

In one embodiment which is well known and particularly popular owing to its advantages as regards the simplicity and low cost of the structure, and as regards the high degree of safety and reliability of operation, the device comprises a central droop restrainer stop common to all the blades and including a rigid so-called "droop restrainer" ring mounted so that it can move radially with respect to the rotor mast, and against which, when the rotor is stationary or at low rotational speeds of the rotor, the bearing tracks of rigid lower bearing shoes bear, each of which shoes is secured to a lower part of the root of a blade or of a member for linking the blade to the hub of the rotor.

When the rotor is turning on the ground at a speed above a given threshold, corresponding to a speed which is sufficient to allow the rotor to be controlled effectively using the flight controls or, in flight, for example when it is turning at its nominal speed, the laterally shiftable droop restrainer ring allows the disc of the rotor to be inclined using the cyclic pitch control, because the blade entering the lowest position in its rotation about the axis of the rotor pushes the droop restrainer ring back on the opposite side towards a blade entering the highest position, so that the droop restrainer ring can shift laterally without opposing the movements of the blades.

With the rotor halted, the droop restrainer ring also allows the blades to be controlled in terms of pitch in order to control the free excursion of the pitch control, because the control of a change in the pitch of the blades bearing on the droop restrainer ring via their lower bearing shoe causes the droop restrainer ring to be driven through a small rotation by the blades with slight gliding of the bearing surfaces.

However, a droop restrainer stops device with a droop restrainer ring as described for example with reference to FIGS. 3 and 5 of Patent FR 2,427,251 exhibits a drawback when a gust of wind, for example, arrives during the critical phases of starting-up or stopping the rotor, when its rotational speed is below the aforementioned threshold, and thus when the centrifugal force is therefore not yet high enough to stabilize the blades in their plane of rotation. Under these conditions, what happens is that the gust of wind may push one of the blades hard downwards, so that it presses violently against the droop restrainer ring which, not being subjected to sufficient reaction forces from the other blades, assumes an extreme radially offset position in which it does not prevent the violently pushed-down blade from reaching a dangerous position of great inclination and possibly from striking or chopping off by its end the tail boom or cabin of the helicopter. Likewise, and still when the rotor is stationary or at low speed, a blade may be lifted by a strong gust of wind and assume a large cone angle, then fall back heavily onto the droop restrainer ring, damaging the latter and/or the lower bearing shoe of the blade, which itself is subjected to an instantaneous bending moment which is very much higher than the loads which it can normally withstand, and this may lead to it becoming unserviceable.

In general, starting from the position of equilibrium of the flapping masses, in which there is equilibrium between the static moments of the flapping masses and the reactional moments of contact of the droop restrainer stop tracks with the droop restrainer ring, which is free in the radial plane with respect to the axis of the rotor and ensures equilibrium of the whole by being subjected to forces of contact of all of the blades (which forces are opposed in pairs in a four-bladed rotor), if, for whatever reason, one of the flapping masses pivots upwards, equilibrium is lost. The droop restrainer ring which is unloaded on one side is driven onto this side by the opposite flapping mass which, thus freed, droops downwards, pivoting about its axis of flap. This downwards movement of one blade puts the crew, and the helicopter, and nearby equipment in great danger.

In addition to the wind, the reasons which may cause the equilibrium of the flapping masses to be lost, are circumstances which induce forces on the flapping masses, such as movements of the ship and/or the handling of the helicopter and/or the folding-up or deploying of the blades. When a blade is folded from the front towards the back of the helicopter, equilibrium is lost when the centre of gravity of the corresponding flapping mass changes to that side of the flap axis of this blade where the rotor axis is located, which reverses the direction of its static moment, and therefore causes the flapping masses to lose equilibrium. The blade opposite the folded-up blade bends rapidly downwards until it is halted by a flight flap stop, which was not designed for this. During deployment of a blade, the loss of equilibrium of the flapping masses causes a tilting which is the opposite of the aforementioned one and just as dangerous.

In order to overcome this drawback, without abandoning the use of a droop restrainer stop with droop restrainer ring, Patents FR 2,434,079 and FR 2,636,914 propose a flap stops device combining droop restrainer stops with droop restrainer ring and lower bearing shoes for the blades, and upper stops limiting the upward angular excursions of the blades. In such a device, when a blade bends downwards, when the rotor is stationary or turning at low speed, the lower bearing shoe of this blade radially pushes against the droop restrainer ring which itself pushes against the lower bearing shoe of at least one of the other blades of the rotor, in the raising direction. However, this raising is limited by the upper flap stops which, when the rotor is stationary or turning at low speed, are still in the working position. The droop restrainer stops or lower stops therefore cooperate with the upper stops in such a way as to reduce the risk of damage to the rotor.

In FR 2,434,079, the anti-cone stops comprise, for each blade, on the one hand an upper bearing shoe secured to the part for attaching the blade to the hub and, on the other hand, an upper stop carried by the hub and which can be retracted or moved out of the way by the action of centrifugal force to which it is subjected when the rotor is turning with a rotational speed above the given threshold and sufficient to allow the rotor to be controlled by the flight controls of the helicopter. This upper stop is a cranked lever pivoting about a pin parallel to the axis of the rotor and acted upon by a return spring so that in the "ground" position, the spring keeps the lever such that its first arm, constituting the bearing stop proper, is in a position for halting the upper bearing shoe of the corresponding blade and so that its second arm, carrying a flyweight sensitive to the action of centrifugal force in order to cause the lever to pivot against the return spring, bears, over part of its length, against a ring supporting the pivot of the crank lever. The two arms of the latter form an angle such that the centrifugal force applied to the flyweight when the rotor is turning tends to overcome the return force of the spring and to cause the lever to pivot in a direction such that its first arm is moved away from the upper bearing shoe facing it on the corresponding blade.

In FR 2,636,914, the anti-cone stops also include, for each blade of the rotor, an upper bearing member secured to the part for attaching the blade to the hub, and an independent upper stop which can be retracted automatically by centrifugal force, comprising a lever mounted so that it can tilt on a pivot secured to the hub, and a first arm of which is shaped into a stop finger, while a second arm carries a flyweight and exhibits a bearing part intended to come against a bearing surface secured to the hub, as well as a return spring returning the lever towards a "ground" position in which the bearing part of the second arm of the lever rests against the bearing surface of the hub and the stop finger of the lever is directed towards the corresponding upper bearing member, so as to limit the upwards excursions of the blade.

In these two known embodiments, the stops carried by the hub are individual and specific to each blade, so the device includes a large number of components. Furthermore, in FR 2,636,914, each pivoting anti-cone stop is mounted inside a sleeve or clevis for attaching the blade to the hub, and this poses problems of accessibility for maintenance.

In these two known embodiments, the devices are suitable for the main rotors of helicopters of low or medium tonnage, and exhibit structures with which there are associated risks of breakage of the anti-cone stops and risks of inadvertent retraction when they are mounted on the rotors of heavy helicopters, even if these embodiments remain compatible with the possibilities regarding bulk, complexity, and permissible mass in such rotors.

In particular, inadvertent retraction or breakage of an anti-cone stop, which may also be the origin of a loss of equilibrium of the flapping masses, may result not only from the abnormal forces mentioned hereinabove, via the flapping masses, but also from forces such as those transmitted by manoeuvring the stick during manual folding of a blade, or inertial loading on a retraction flyweight in the event of vertical impact, of the step impulse type, when, as in FR 2,636,914, the anti-cone stop pivots about a pin perpendicular to the axis of the rotor.

SUMMARY OF THE INVENTION

The problem upon which the invention is based is therefore to overcome these drawbacks and to provide a flap stops device with upper stops which can be retracted in flight and which is suitable for main rotors equipped with large, heavy blades.

One objective of the invention is therefore to provide a flap stops device which, while retaining the conventional properties of anti-cone stops which can be retracted in flight (that is to say limiting, on the ground, the upwards flapping of the flapping masses which may result from gusts of wind or alternatively from impacts during the handling of the helicopter and, in flight, freeing the flapping masses so as to allow, in terms of flap, the whole flight range of the blades) gives, in the "ground" position, a minimum play in terms of flapping, as well as good rigidity in contact with or without impact for withstanding the considerable forces of the flapping masses on the hub, and while avoiding any inadvertent retraction.

A complementary object of the invention is to propose a flap stops device with retractable upper stops and which is insensitive to the vertical inertial force of the flyweights, and to stick manoeuvres during manual folding of the blades, in the "ground" position, and which, in the "flight" position, ensures rapid retraction, good dynamic balance, and complete safety in the event of one or more return springs breaking, as well as insensitivity to icing-up. From the overall point of view, the flap stops device must be of a small size, low mass, and have just a few components.

Yet another object of the invention is to propose a device with retractable upper flap stops advantageously cooperating with a droop restrainer stop with droop restrainer ring in order simultaneously to form hybrid flap and drag stops.

To this end, the flap stops device according to the invention, of the type known from FR 2,434,079, for a rotorcraft main rotor, in which each blade is attached to the hub of the rotor by an attachment part joined to the hub by holding and articulating means, and including, for each blade, an upper stop mounted so that it can move position, in which each upper stop is directly facing and a small clearance away from a stop track of an upper bearing shoe mounted on the attachment part of the corresponding blade so as to limit the upwards flapping of the blade by means of contact of the stop track of its upper bearing shoe against the corresponding upper stop at rotational speeds of the rotor which are zero and below a threshold corresponding to a speed which is sufficient to allow the rotor to be controlled using the flight controls of the rotorcraft, and at least one flyweight mounted so that it can pivot on the hub about a pin substantially parallel to the axis of the rotor and mechanically joined to at least one upper stop, so that at rotational speeds of the rotor which are greater than the threshold, each flyweight is moved away from the axis of the rotor under the effect of centrifugal force acting upon it, and the upper stops are retracted against elastic return means into a "flight" position such that they no longer face the upper bearing shoes of the blades which are no longer limited in terms of upwards flapping by the upper stops, is characterized in that the upper stops each project outwards from a common ring substantially coaxial with the hub and mounted so it can rotate about the axis of the rotor on an upper part of the hub, and each flyweight is mechanically joined to the ring by means for driving the ring in rotation about the axis of the rotor, from the "ground" to the "flight" position of the upper stops when it is moved away from this axis by centrifugal force, and against the elastic return means which tend to return the ring to the "ground" position of the upper stops and each flyweight towards the axis of the rotor. Advantageously, in addition, the upper stops consist of protrusions, equal in number to the blades, in the form of projections from the rotary ring and integral with it. Anti-cone stops are thus produced which have great rigidity and great strength, have a simple and economic structure, include few parts as they are essentially of a monobloc structure, and have a limited bulk freeing a large amount of space above the hub, this space being available for other systems, for example sighting systems or deicing systems.

In order to respect the dynamic balance of the rotor, the device comprises at least two flyweights which, together with the mechanical means by which the rotary ring is driven by the flyweights and the means for elastic return of the ring and of the flyweights, are symmetric with respect to the axis of the rotor.

In order to ensure the correct arrangement of the upper flap stops in the "ground" and "flight" positions, the rotary ring and the means for supporting the ring on the hub advantageously each display, on the one hand, respectively one of two first rotation stops interacting in the circumferential direction to halt the rotation of the ring in the "ground" position under the action of the elastic return means and, on the other hand, respectively one of two second rotation stops interacting in the circumferential direction to halt the rotation of the ring in the "flight" position under the action of centrifugal force acting on each flyweight.

The elastic return means may act directly on the flyweights, as in the state of the art, but they preferably comprise at least one helical spring joining a fixed point of the ring to a point, which is fixed with respect to the hub of the rotor, of the means for supporting the ring on the hub.

In a first embodiment, the mechanical drive means joining each flyweight to the rotary ring comprise a pinion having a hub from which the flyweight overhangs, and which is mounted so that it can pivot about a pivot pin linked to means for supporting the ring on the hub of the rotor, the pinion meshing with toothing of the ring, so that the pivoting of each flyweight and of the corresponding pinion about the pivot pin under the predominant effect of centrifugal force or of the elastic return means are simultaneous with the rotations of the rotary ring from the "ground" position to the "flight" position or in the opposite direction, respectively.

According to another embodiment, the mechanical drive means comprise a lever with two arms articulated together via one of their ends, and of which a first arm, supporting the flyweight at its opposite end, is mounted so that it can pivot between its ends on a fixed point of the means for supporting the ring on the hub, while the second arm is articulated by its opposite end at a fixed point of the ring so that any pivoting of the first arm moving the flyweight respectively away from or towards the axis of the rotor induces a movement of the second arm and a rotation of the ring on its means for support on the hub from the "ground" position to the "flight" position, or in the opposite direction respectively. As an alternative, toggle joints or cable connections may be substituted, for each flyweight, for the lever with two articulated arms.

According to yet another embodiment, which is advantageous from the points of view of simplicity of the means and of reliability, the mechanical drive means comprise a rod carrying the flyweight at one end, and mounted so that it can pivot via its opposite end on a fixed point of the ring and so that it can slide between its ends in means forming a pivoting and gliding link at a fixed point of the means for supporting the ring on the hub, so that any movement of the flyweight under the effect of centrifugal force or of the elastic return means leads, by pulling on the sliding and pivoting rod, to a rotation of the ring from the "ground" position to the "flight" position or in the opposite direction, respectively.

The gliding and pivoting link means may comprise a ball joint through which the rod passes in a sliding manner, and which is held in pivoting fashion in a ball joint socket of the said means for supporting the ring on the hub, but, in a more crude and more reliable embodiment, with no risk of jamming regardless of the weather conditions, and which in particular is insensitive to icing-up and to sandstorms, the gliding and pivoting link is provided by an angle bracket, one leg of which exhibits an oblong slot through which there passes, with clearance along the major and minor axes of the slot, the rod passing between two mutually parallel cylinders parallel to the minor axis of the slot and held, on the one hand, on the other leg of the angle bracket and, on the other hand, on a fastening lug of said means for supporting the ring on the hub, said fastening lug being substantially flat and parallel to the other leg of the angle bracket, and the rod also passing with clearance between the fastening lug and the other leg of the angle bracket.

In this embodiment, elastic return means advantageously comprise, for each flyweight, a helical compression spring surrounding the rod between its end pivoting on the ring and the said gliding and pivoting link means, so as to bear, on the one hand, on the ring and, on the other hand, on its means for support on the hub.

In addition, in order to operate simultaneously as a drag stops device, when mounted on a hinged rotor in which the means for holding and articulating each blade on the hub comprise an articulation or laminated spherical bearing, the flap stops device of the invention advantageously additionally includes a droop restrainer stops mechanism including, for all the blades, a common lower stop of the droop restrainer ring type mounted so that it can move radially about a shaft of the rotor, beneath the hub, to which the shaft is rotationally secured, and, for each blade, a lower bearing shoe secured to the part for attaching the blade to the hub and displaying a stop track by means of which the lower bearing shoe comes into contact with the droop restrainer ring at zero and low rotational speeds of the rotor.

For equipping the main rotors of heavy helicopters, another subject of the invention is a rotorcraft rotor head, of the type comprising a rotor hub secured in terms of rotation to a rotor mast about an axis of rotation of the rotor, and to which each of the blades of the rotor is joined by an attachment part which is forked and has two branches, and by means for holding and articulating on the hub which comprise an outer radial armature fixed to the hub, and an inner radial armature fixed to the inner radial ends of the two branches of the corresponding forked attachment part, and which is characterized in that this rotor head comprises a stops device as set out hereinabove, and, for each blade, holding and articulating means including a laminated spherical bearing incorporated between the two corresponding armatures and housed between the two branches of the corresponding forked attachment part, so that its centre of rotation is substantially situated on the same side as the outer radial armature, said forked attachment part of each blade being a substantially radial linking member such as a sleeve shaped at its inner radial end into a clevis, the two branches of which are fixed to the inner radial armature of the corresponding holding and articulating means, and shaped at its outer radial end as a clevis for fixing to the root of the corresponding blade using two pins substantially parallel to the axis of rotation of the rotor, and one of which is optionally removable in order to allow the blade to be folded back by pivoting about the other pin.

BRIEF DESCRIPTION OF THE DRAWINGS

Further features and advantages of the invention will stem from the description given hereinbelow, without implied limitation, of embodiments described with reference to the appended drawings in which.

DESCRIPTION OF THE PREFERRED EMBODIMENTS

Figure 1:
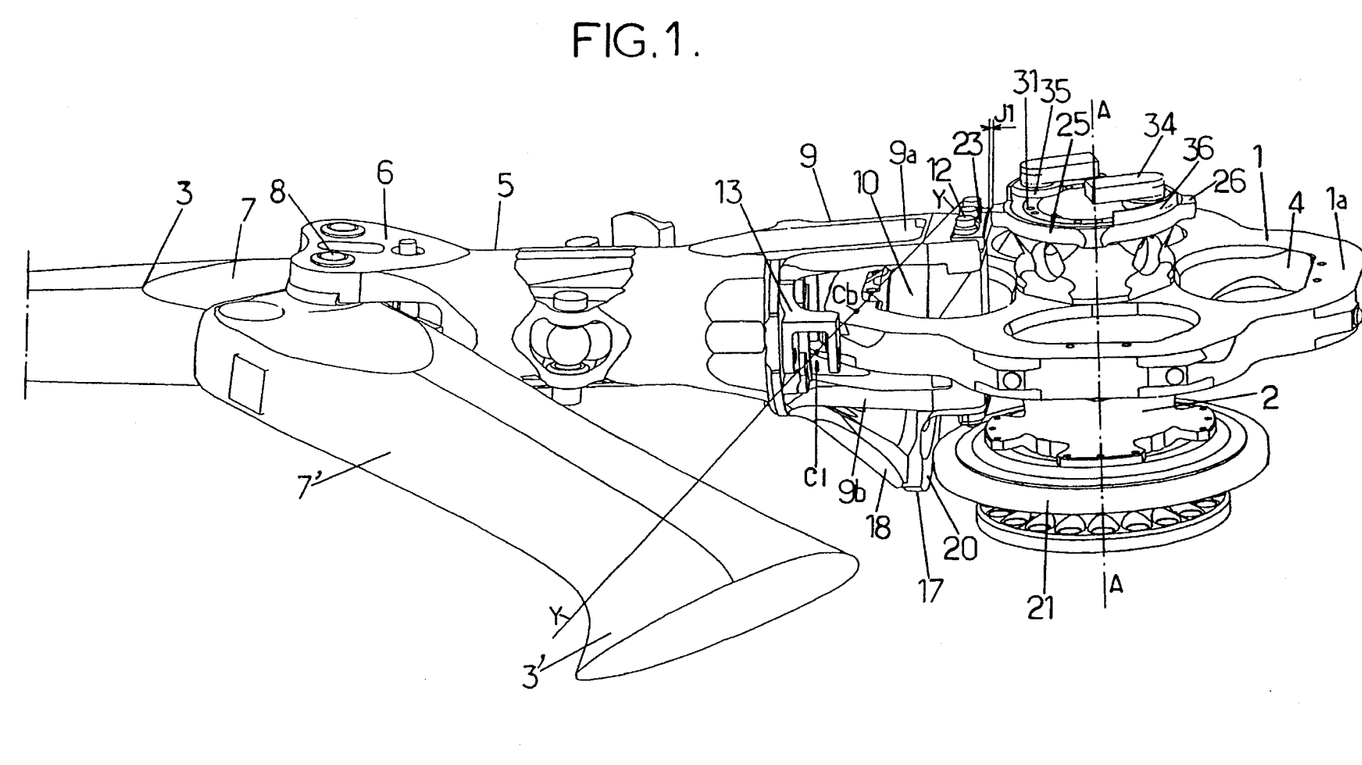
FIG. 1 is a perspective view of the head of a four-bladed rotor with Just one blade for the sake of the clarity of the representation and one upper and lower flap stops device in the "ground" position.

The rotor, the head of which is represented in FIG. 1, of the so-called "hinged" type, comprises a hub 1 secured in rotation to a rotor mast 2 driven in rotation about the axis A—A of the rotor. For each of the blades 3 of the rotor (four blades 3 in this example, opposed in pairs), the hub 1, substantially in the form of a plate having as many swellings 1a projecting radially outwards as the rotor has blades 3, exhibits an axial recess 4 made, in part, in the corresponding swelling 1a of the hub 1. Housed in each recess 4 are means for holding and articulating the corresponding blade 3 on the hub 1, via an attachment sleeve 5. This sleeve 5 has its outer radial end (with respect to the rotor axis A—A) formed as a clevis 6 for linking to the root 7 of the corresponding blade 3, with the aid of two mutually parallel pins such as 8 which are parallel to the rotor axis A—A and pass through bores facing each other in the two, upper and lower, parallel branches of the clevis 6 and in the blade root 7, one of the pins 8 being removable to allow the blade 3 to be folded by pivoting about the other pin 8, as represented as 3' and 7' for the blade and its root in FIG. 1. The inner radial end part of the sleeve 5 is also formed as a clevis 9 for linking to the means 10 for holding and articulating the blade 3 on the hub 1, these means 10 consisting of a laminated spherical articulation or bearing of well known structure.

Figure 2:
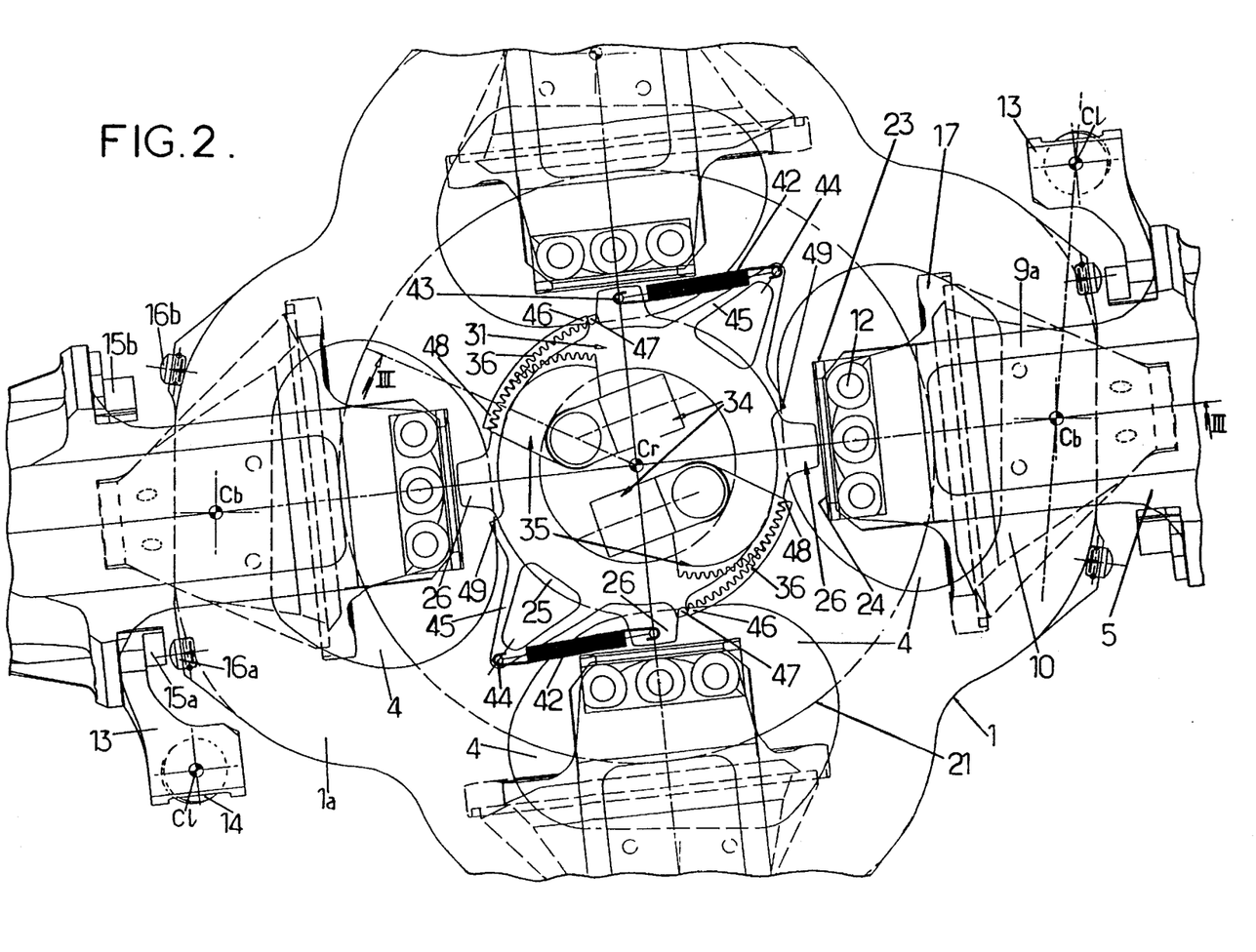
FIG. 2 is a diagrammatic and partial plan view of the rotor head of FIG. 1.
Figure 3:
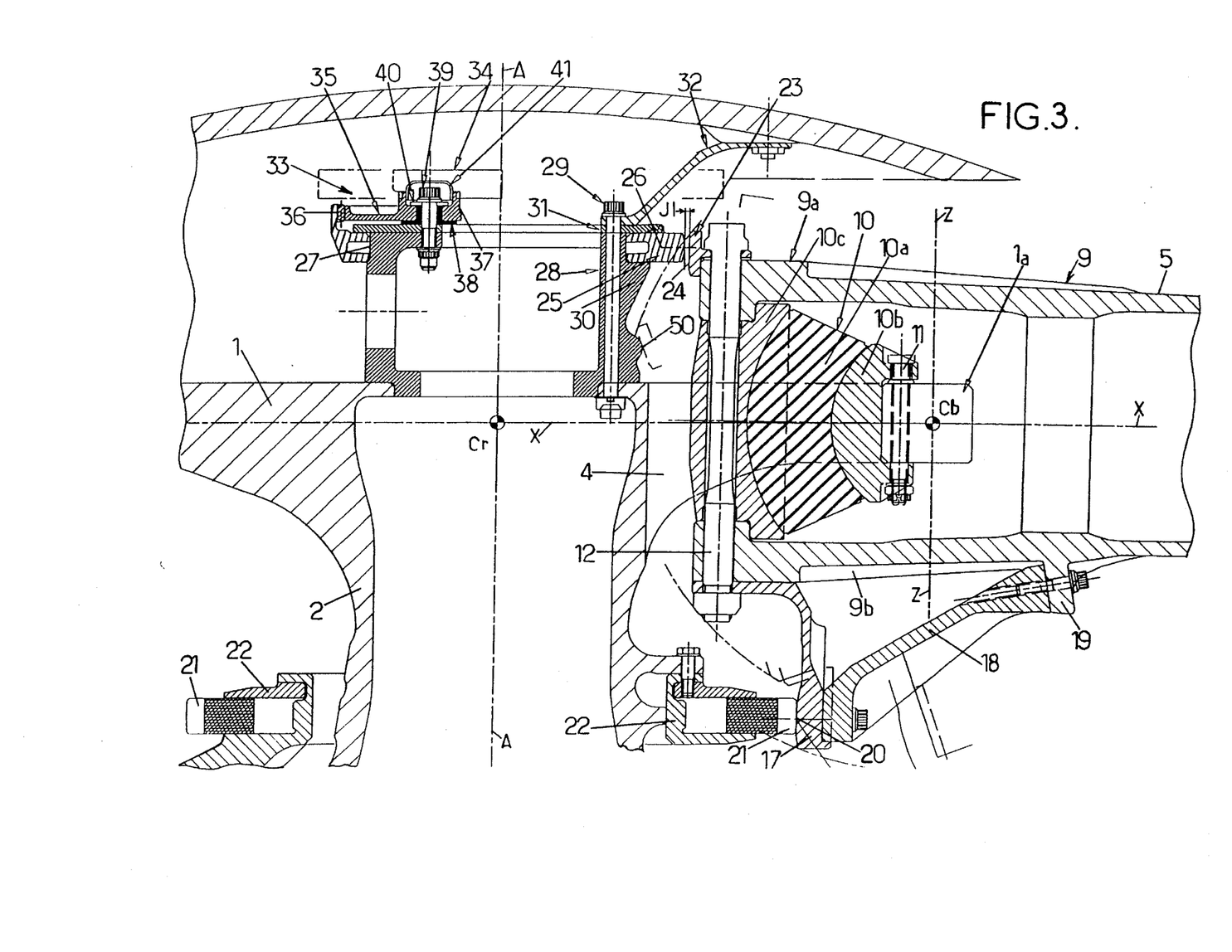
FIG. 3 is a section on III—III of FIG. 2.

As also visible in FIGS. 2 and 3, the laminated spherical bearing 10 comprises a central part 10a consisting of an alternating stack of rigid dished elements and of leaves of an elastic elastomer in the form of spherical caps, the leaves of elastomer and the rigid dished elements being secured to one another by vulcanization, and this central part 10a is bonded via its concave outer radial face against the convex inner radial face of an outer radial armature 10b shaped as a yoke straddling the outer radial edge of the corresponding recess 4 and fixed by bolts such as 11 to the edge of the corresponding swelling 1a of the hub 1. The central part 10a of the laminated spherical bearing 10 is also bonded via its convex inner radial face into a concave recess of corresponding shape of an inner radial armature 10c mounted in the manner of a spacer piece between the upper branch 9a and lower branch 9b of the inner radial clevis 9 of the sleeve 5, and to which branches the inner armature 10c is fixed by three bolts such as 12 parallel to the rotor axis A—A and extending in a plane perpendicular to the longitudinal pitch-change axis X—X of the corresponding blade 3, which axis X—X passes through the centre Cr of the rotor, on the rotor axis A—A, and through the centre Cb of the laminated spherical articulation 10, this centre Cb being situated in the part 1a of the hub 1 on which the outer armature 10b bears.

For each blade 3, the centre Cb of the corresponding laminated spherical articulation 10 is the meeting point of the pitch axis X—X, drag axis Z—Z, parallel to the rotor axis A—A, and flap axis Y—Y passing also through the centre C1 of an articulation 14 (ball joint) at the end of the pitch lever 13 bolted onto the sleeve 5, on the leading edge side of the corresponding blade 3, and between the branches 9a and 9b of the inner clevis 9. The pitch lever 13 also carries one 15a of two flight drag stops 15a and 15b fixed to the sleeve 5 on either side of the pitch axis X—X and coming to bear against respectively one of two flight drag stops 16a and 16b fixed so that they project radially outwards from the edge of the swelling 1a of the hub 1 so as to limit, in flight, the angular excursions of the blade 3 in drag forwards or backwards with respect to the direction of rotation of the rotor.

The rotor is equipped with droop restrainer stops comprising, for each blade 3, a lower bearing shoe 17 fixed below the lower branch 9b of the inner clevis 9 of the corresponding sleeve 5 by the bolts 12 which fix the two branches 9a and 9b of this clevis on the inner armature 10c of the laminated spherical articulation 10, and this lower bearing shoe 17, substantially in the shape of an angle bracket, is stiffened by a brace 18 bolted to the lower end of the shoe 17 and to an anchoring lug 19 of the lower branch 9b. Towards the mast 2, the shoe 17 displays a droop restrainer stop track 20 which is flat and perpendicular to the pitch axis X—X, via which track it comes to bear against the periphery of a droop restrainer ring 21 when the rotor is stationary or turning slowly. The droop restrainer ring 21 surrounds the rotor mast 2, beneath the hub 1, and is mounted so that it can move freely in a radial plane inside an annular support 22 of U-section, open radially towards the outside and fixed to the mast 2.

With the rotor stationary, the four flapping masses, each of which consists of a blade 3, of the corresponding sleeve 5 with its pitch lever 13 as well as the other components carried by the blade 3 and the sleeve 5, rest via the droop restrainer stop tracks 20 against the droop restrainer ring 21, free in a radial plane and ensuring balance of the assembly as it is subjected to the four contact forces which are opposed in pairs. There is therefore balance between the static moments of the flapping masses and the reaction moments of contact of the droop restrainer stop tracks 20 on the droop restrainer ring 21.

In order to limit the upwards flapping of each blade 3, the sleeve 5 is also equipped with an upper bearing shoe 23 fixed to the top face of the inner radial end of the upper branch 9a by the bolts 12 for fixing to the inner armature 10c of the articulation 10, and this shoe 23 also displays an upper stop track 24 which is flat and perpendicular to the pitch axis X—X.

To cooperate with the upper stop tracks 24, the hub I is equipped with an anti-cone stop ring 25. This ring 25, solid and very rigid, is of a single piece with protrusions 26 projecting radially outwards from the ring 25, equal in number to the blades 3 and distributed in a circumferential direction around the perimeter of the ring 25 so that in a "ground" position (speed of rotation below a threshold), each protrusion 26 forming an upper stop is directly facing and a small clearance J1 away from the upper stop track 24 of a blade 3. This ring 25 is centred on the rotor axis A—A about which it is mounted so that it can rotate on a bearing surface 27 formed in the upper part of a support 28 of cylindrical overall shape fixed by bolts such as 29 to the top face of the central part of the hub 1. The ring 25 is kept facing the bearing surface 27 and prevented from translating axially on the one hand by a shoulder 30 of the support 28 and on the other hand by a plate 31 fixed to the top of the support 28 by the bolts 29 which simultaneously fix to the plate 31 a cupola support 32 for providing an aerodynamic and protective fairing for the upper part of the rotor head.

Figure 4:
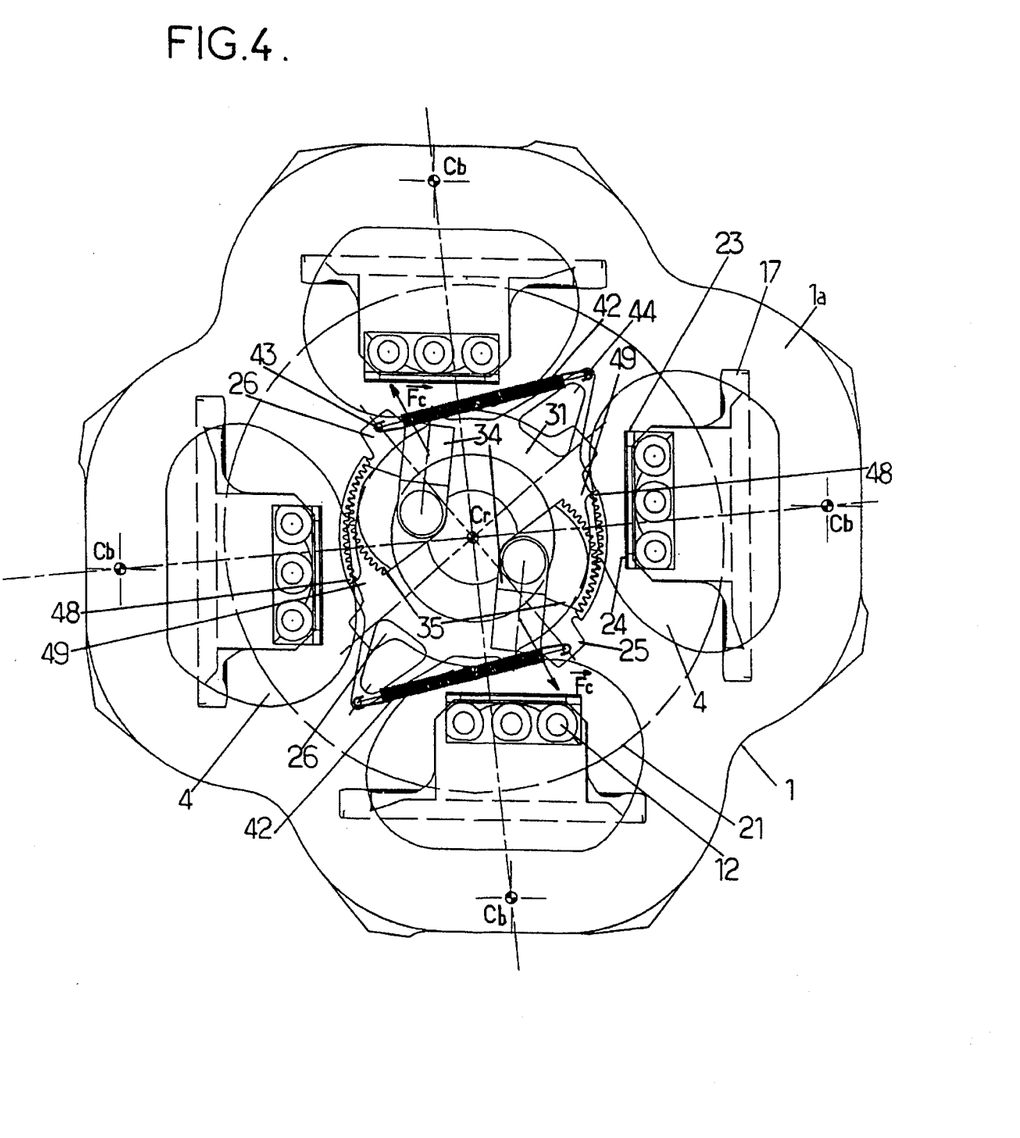
FIG. 4 is a diagrammatic and partial plan view representing the stops device in the "flight" position on the rotor head of FIGS. 1 to 3, FIGS. 5 and 6 are views similar to FIG. 4 of a second example of a stops device in the "ground" and "flight" positions respectively, on the rotor head of the preceding figures.

In order to allow the flapping of the blades 3 which is necessary for the coning of the rotor in flight, the ring 25 is driven in rotation about the rotor axis A—A so as to retract the upper stops 26 or move them out of the way so that the upper stop tracks 24 each move between two upper stops 26. This rotation of the ring 25 is controlled by two retraction mechanisms which are perfectly symmetric with respect to the rotor axis A—A to ensure balance in rotation. Each retraction mechanism 33 comprises a flyweight 34, a pinion 35 and toothing 36 at the top part on the periphery of the ring 25. The flyweight 34 is mounted so that it overhangs the hub 37 of the pinion 36, limited to a circular sector, and the teeth of which mesh with those of the straight-cut toothing 36 turned towards the centre of the ring 25. Via its hub 37, the pinion 35 (and therefore also the flyweight 34) is mounted so that it can pivot about an axis parallel to the rotor axis A—A on the support 28 and the plate 31 with the aid of a shouldered bushing 38 clamped onto the plate 31 by a bolted pivot pin 39. The pinion 35 is centred via its hub 37 with clearance around the shouldered bushing 38 and prevented from axial translation, also with clearance, by a washer 40 between the shouldered bushing 38 and the head of the bolted pivot pin 39. The friction region between this pivot pin, the shouldered bushing 38 and the hub 37 of the pinion 35 is protected by a cap 41 inserted into the hub 37 of the pinion 35. A helical return spring 42 (see FIG. 2) is attached by one end to a stud 43 projecting above an upper stop 26 of the ring 25 and, by the other end, to a peg 44 projecting above a radial arm 45 which is perforated and projects towards the outside of the plate 31. This spring 42 returns the ring 25 in rotation to the ground position, represented in FIGS. 1 to 3, and in which, to position each upper stop 26 of the ring 25 with a small clearance J1 facing each upper stop track 24, the spring 42 presses the rotation stop 46, formed by one end of the corresponding toothing 36 of the ring 25 against a stop 47 projecting radially from the plate 31. In this ground position, the pinions 35 and flyweights 34 of the two retraction mechanisms 33 are turned in such a way that the two flyweights 34 are close to the axis A—A of the rotor and parallel to each other, on either side of this axis. When the rotational speed of the rotor exceeds a threshold corresponding to sufficient speed to allow 20 the rotor to be controlled effectively using the flight controls, the flyweights 34, subjected to the action of centrifugal force, drive the pinions 35 in rotation around the shouldered bushings 38 against the springs 42 which are stretched and loaded, causing, by cooperation of the pinions 35 with the toothings 36 of the ring 25, the rotation of the latter, as represented in FIG. 4, until the rotation stop 48 at the other end of each toothing 36 of the ring 25 comes into contact with a stop 49 projecting radially from the plate 31. In this flight position, the upper stops 26 of the rotary ring 25 are retracted with respect to the upper stop tracks 24, which allows the blades 3 to flap about their axis of flap Y—Y through the flight envelope. Of course, the stiffness of the springs 42 is adapted, especially with respect to the flyweights 34, so as to obtain the beginning and end of retraction travel as a function of desired values of the rotational speed of the rotor.

In flight, if necessary, an anti-cone stop secured to the hub 1 and interacting with the upper stop track 24 of a blade 3 to limit the upwards flapping thereof to a maximum angle of approximately 20° for example, consists of a boss 50 projecting outwards from the support 28, between the shoulder 30 of the latter and its lower part by means of which it bears on the hub 1 (see FIG. 3). The relative positions of the flyweights 34, of the pinions 35, of the ring 25 and of the upper stops 26, of the springs 42, of the plate 31 and of the stops 48 and 49 in the flight position are represented in FIG. 4, in which the action of centrifugal force on the flyweights 34 has been indicated by arrows Fc.

Figure 5:
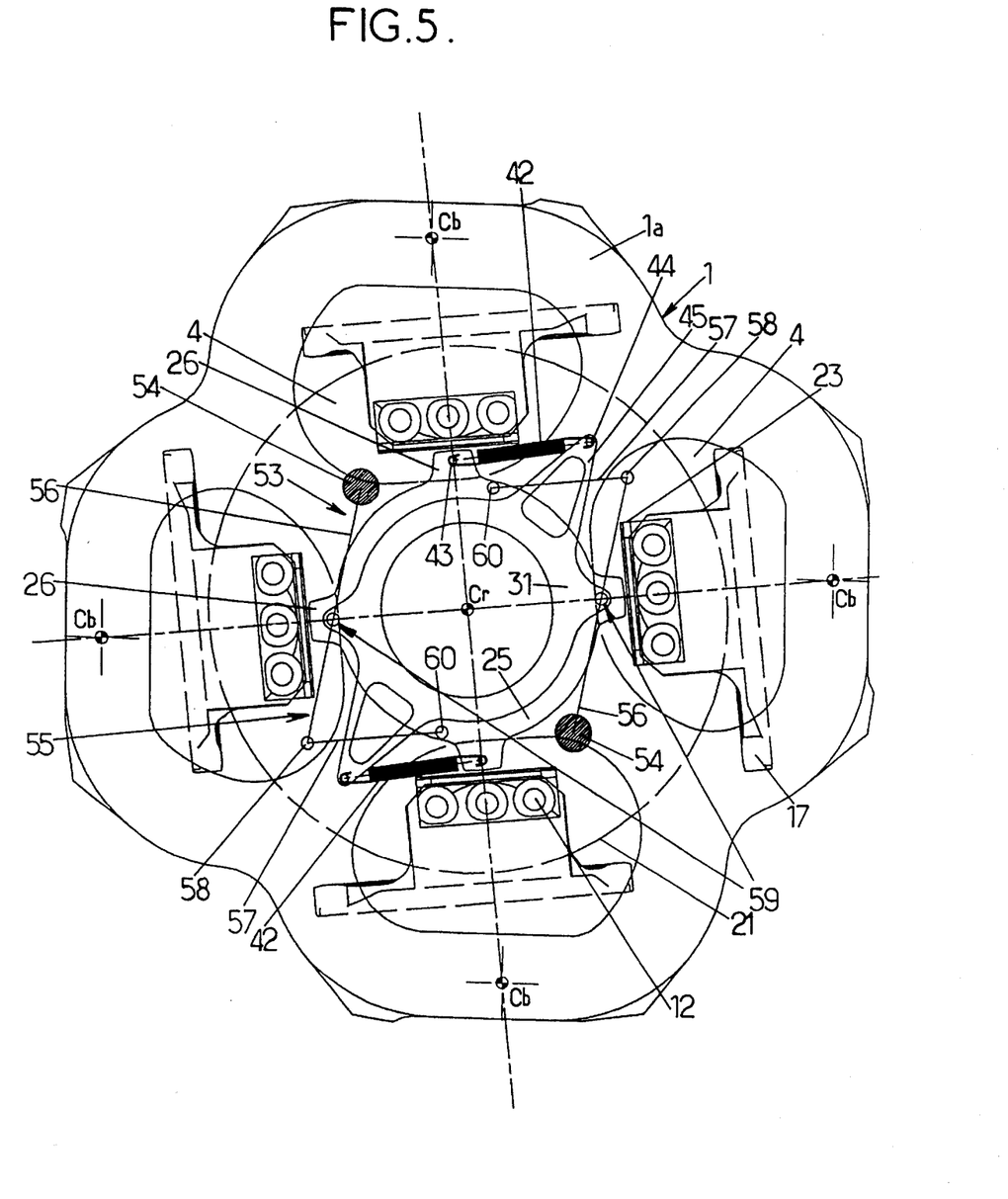
Figure 6:
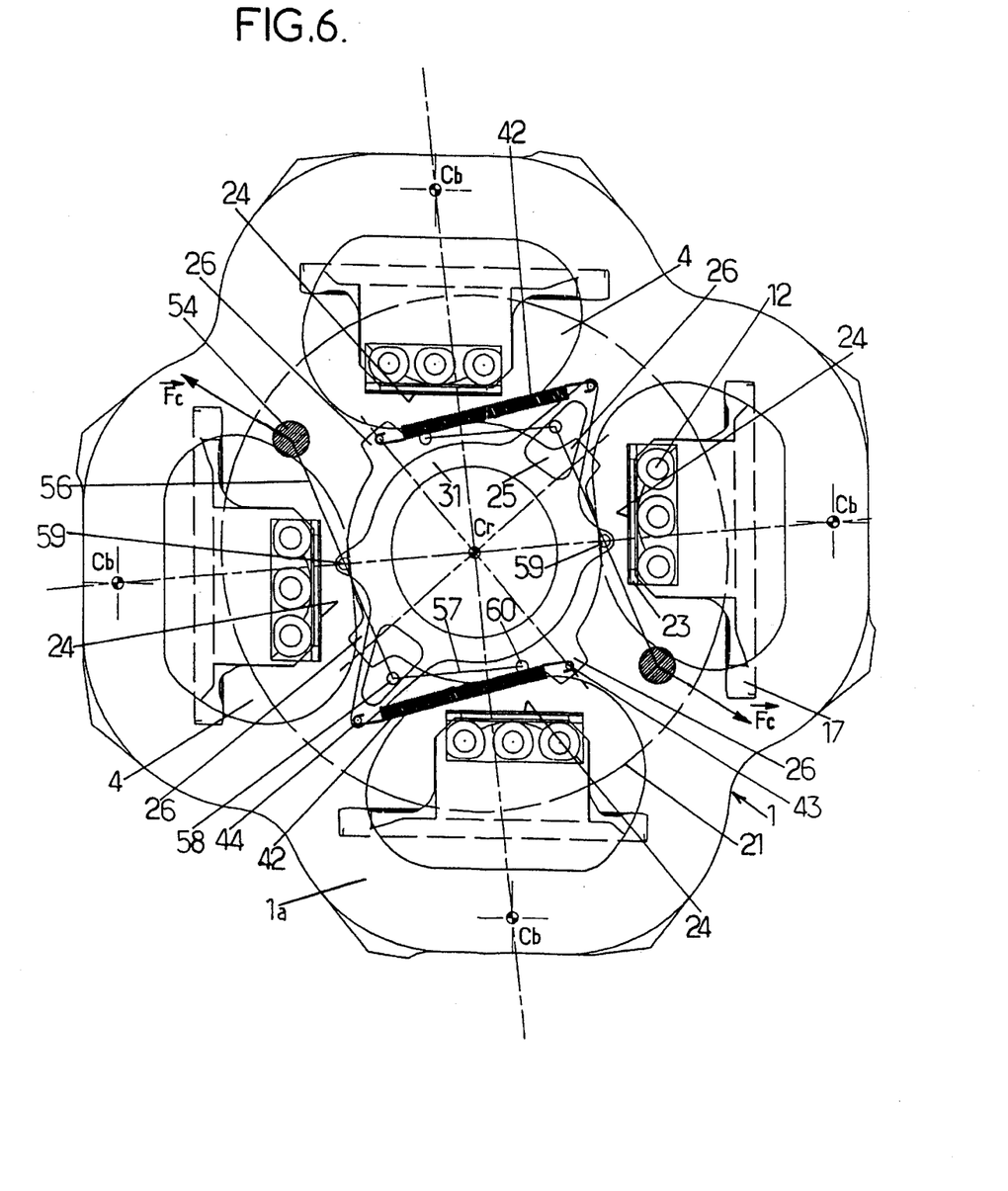

FIGS. 5 and 6 represent respectively in the "ground" and "flight" positions a device similar to that of FIGS. 1 to 4, and which is distinguishable from the latter merely by the embodiment of the two retraction mechanisms 53, so that the similar elements are denoted by the same numerical references. In particular, we see again the rotary ring 25 with its protrusions forming upper stops 26 and its rotation stops interacting with rotation stops of the plate 31, as well as the two springs 42 each one fastened via its ends on the one hand to a peg 44 of a radial arm 45 of the plate 31 and, on the other hand, to a stud 43 of an upper stop 26 of the rotary ring 25. However, in this example, each retraction mechanism 53 includes a flyweight 54 fixed to one end of a first arm 56 of an articulated lever 55 comprising a second arm 57 articulated by one end at 58 to the other end of the first arm 56, which arm is mounted so that it can pivot in its central part about an axis parallel to the axis of the rotor A—A on a pivot 59 fixed to the plate 31, while the second end of the second arm 57 is articulated to a fixed point 60 of the ring 25.

In the "ground" position (FIG. 5), the flyweights 54 are close to the periphery of the ring 25 and to the plate 31 and the two arms 56 and 57 of each articulated lever 55 form an acute angle.

In the "flight" position (FIG. 6), under the action of centrifugal force Fc acting upon each flyweight 54, and owing to the rotation of the rotor at a speed greater than the aforementioned threshold, the flyweights 54 have moved radially away from the ring 25 and from the plate 31 and have caused the first arms 56 of the levers 55 to pivot about their pivot 59, which causes the second arms 57 to move in a direction causing them to exert a substantially tangential thrust on the ring 25 thus driven in rotation so as to retract its upper stops 26 against the springs 42. As in the previous example, when the rotational speed of the rotor drops, the loaded springs 42 return the ring 25 in rotation towards the "ground" position, which brings the flyweights radially back inwards, into the initial position, owing to the mechanical link with the ring 25.

Figure 7:
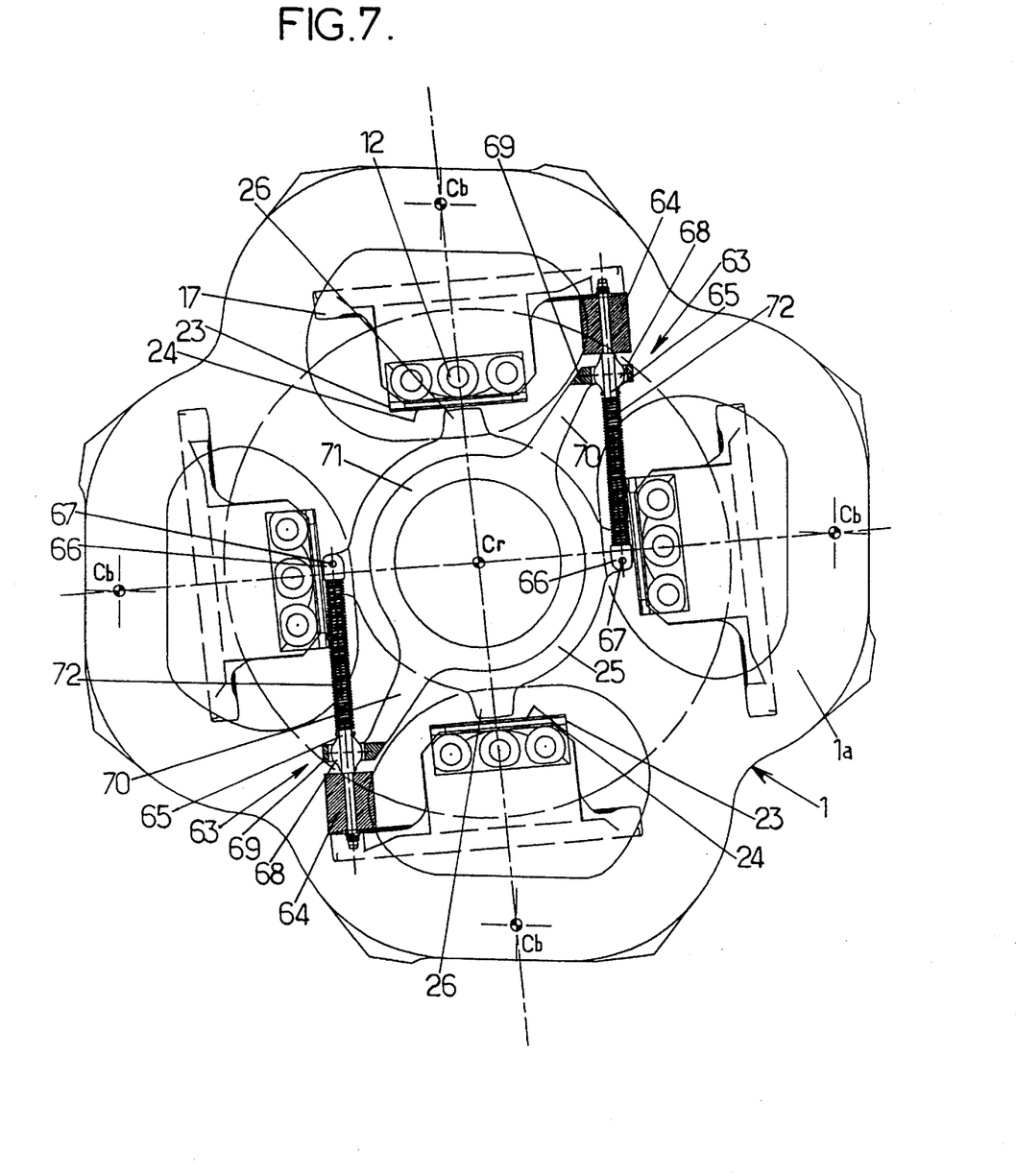
FIGS. 7 and 8 are views similar respectively to FIGS. 5 and 6 for a third example of a stops device in the "ground" and "flight" positions respectively.
Figure 8:
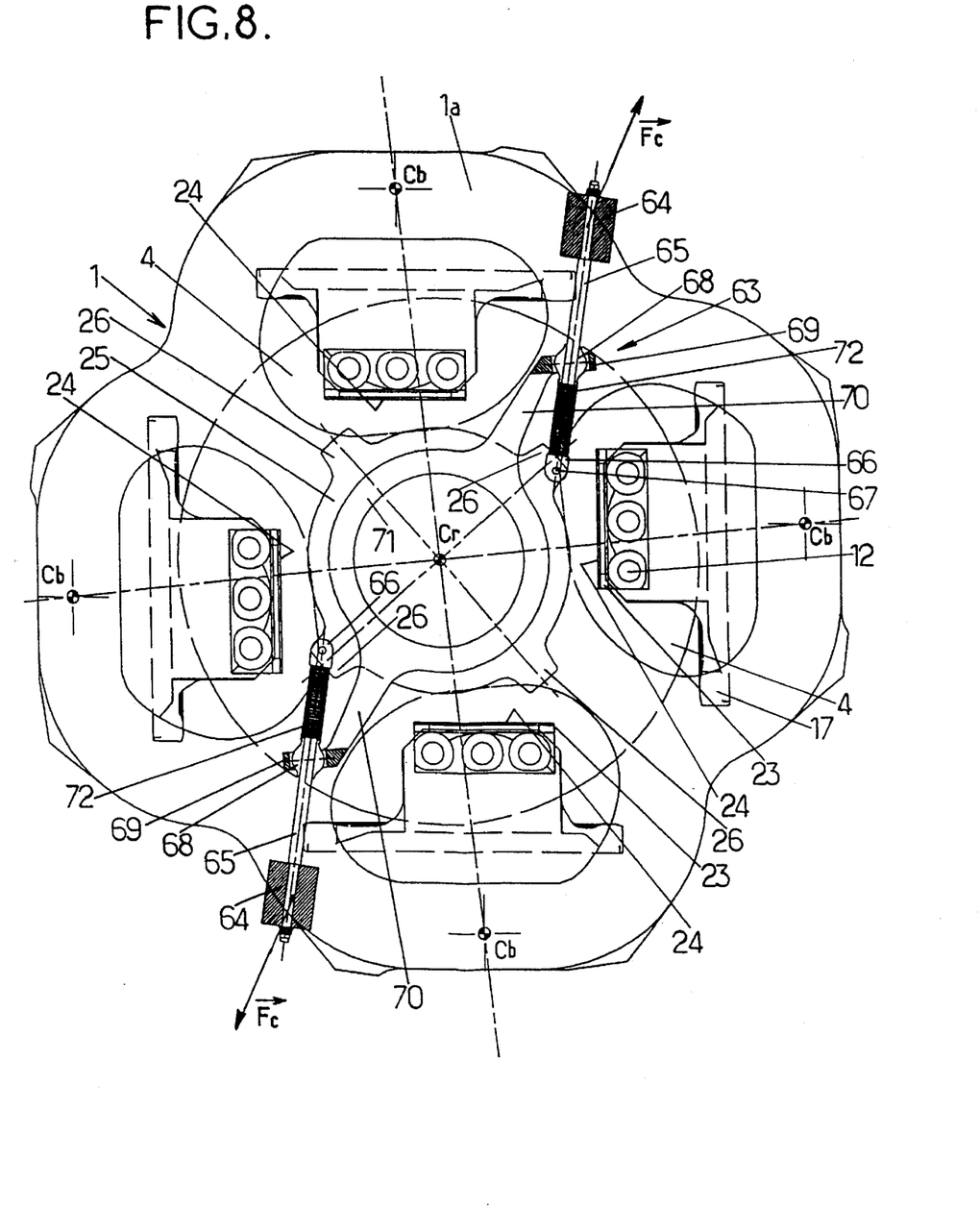

FIGS. 7 and 8 represent, respectively in the "ground" and in the "flight" position, a third embodiment also distinguishable from those of the figures already described merely by the embodiment of the retraction mechanisms 63. Each of them comprises a flyweight 64 mounted on one end of a rod 65 equipped, at its other end, with a socket end fitting 66 by means of which it is mounted so that it can pivot about an axis parallel to the rotor axis A—A on a pivot 67 projecting from one of the upper stops 26 of the rotary ring 25. Between the flyweight 64 and the pivoting end fitting 66, the rod 65 passes in sliding manner through a ball joint 68 held in a ball joint socket 69 secured to the outer radial end of a radial arm 70 of a plate 71 similar to the plate 31 of the previous examples, in order to keep the rotary ring 25 on its support fixed to the hub 1. In addition, in this example, each return spring is a helical compression spring 72 surrounding that part of the rod 65 extending between its end fitting 66 and the ball joint 68, against which end fitting and ball joint it bears via its ends so as to bear against the ball joint socket 69 of the arm 70 of the plate 71 and push the sliding rod 65 back until the flyweight 64 is brought against the ball joint 68, in the ground position (FIG. 7) for which each upper stop 26 of the ring 25 faces an upper bearing shoe 23 of a blade of the rotor.

Under the action of centrifugal force Fc (FIG. 8), each flyweight 64 is moved radially outwards, exerting a pulling force on the rod 65 which slides axially in the ball joint 68, causing the latter to pivot in the ball joint socket 69, and compressing the spring 72 between the ball joint 68 and the end fitting 66, which is moved with the ring 25 in rotation in a direction moving it closer to the ball joint socket 69, by the pulling of the rod 65, which has the effect of retracting the anti-cone stops 26 of the ring 25 with respect to the upper bearing shoes 23. When the rotational speed of the rotor drops, each spring 72 relaxes, pushing the end fitting 66 and the rod 65 in the opposite direction, towards the ground position of FIG. 7.

Figure 9:
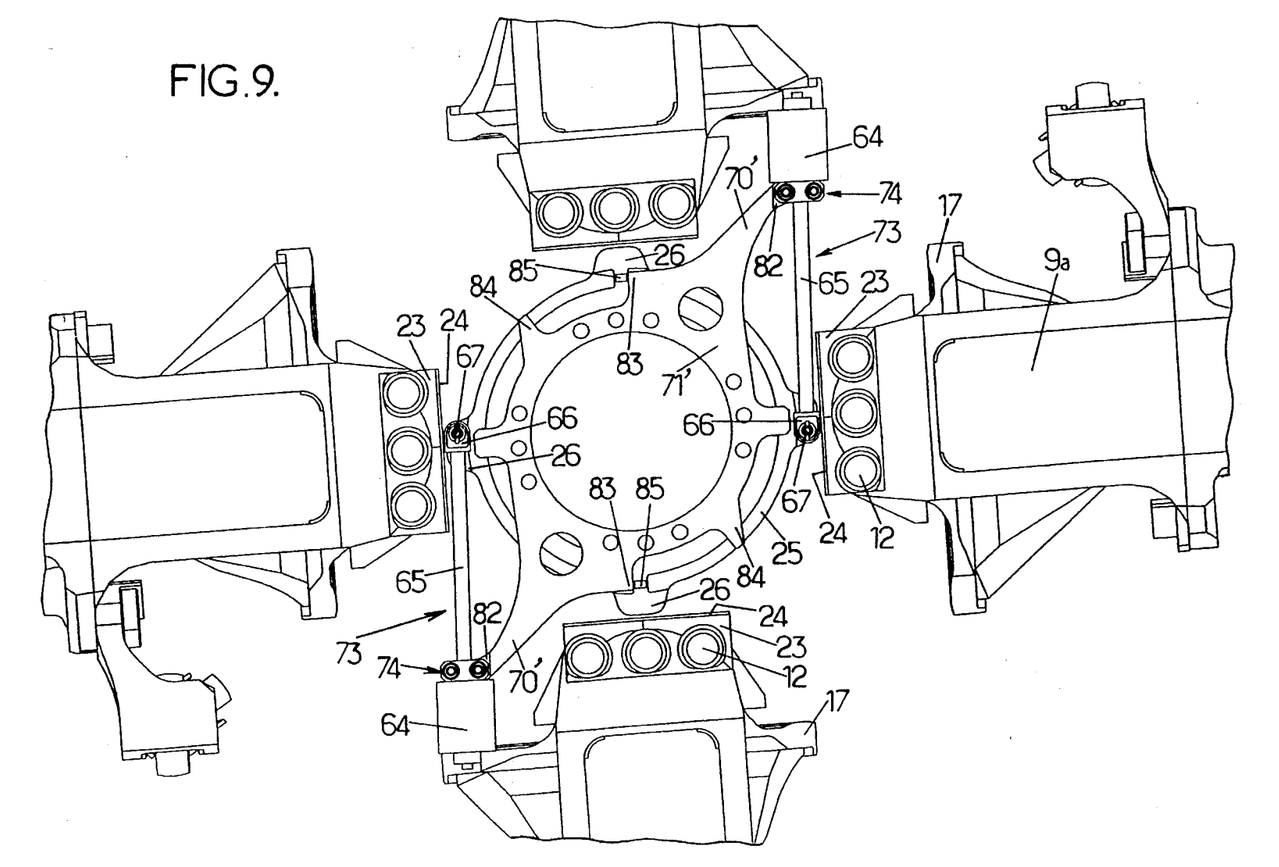
FIG. 9 is a diagrammatic and partial plan view of an alternative to the stops device of FIGS. 7 and 8 in another rotor head.
Figure 10:
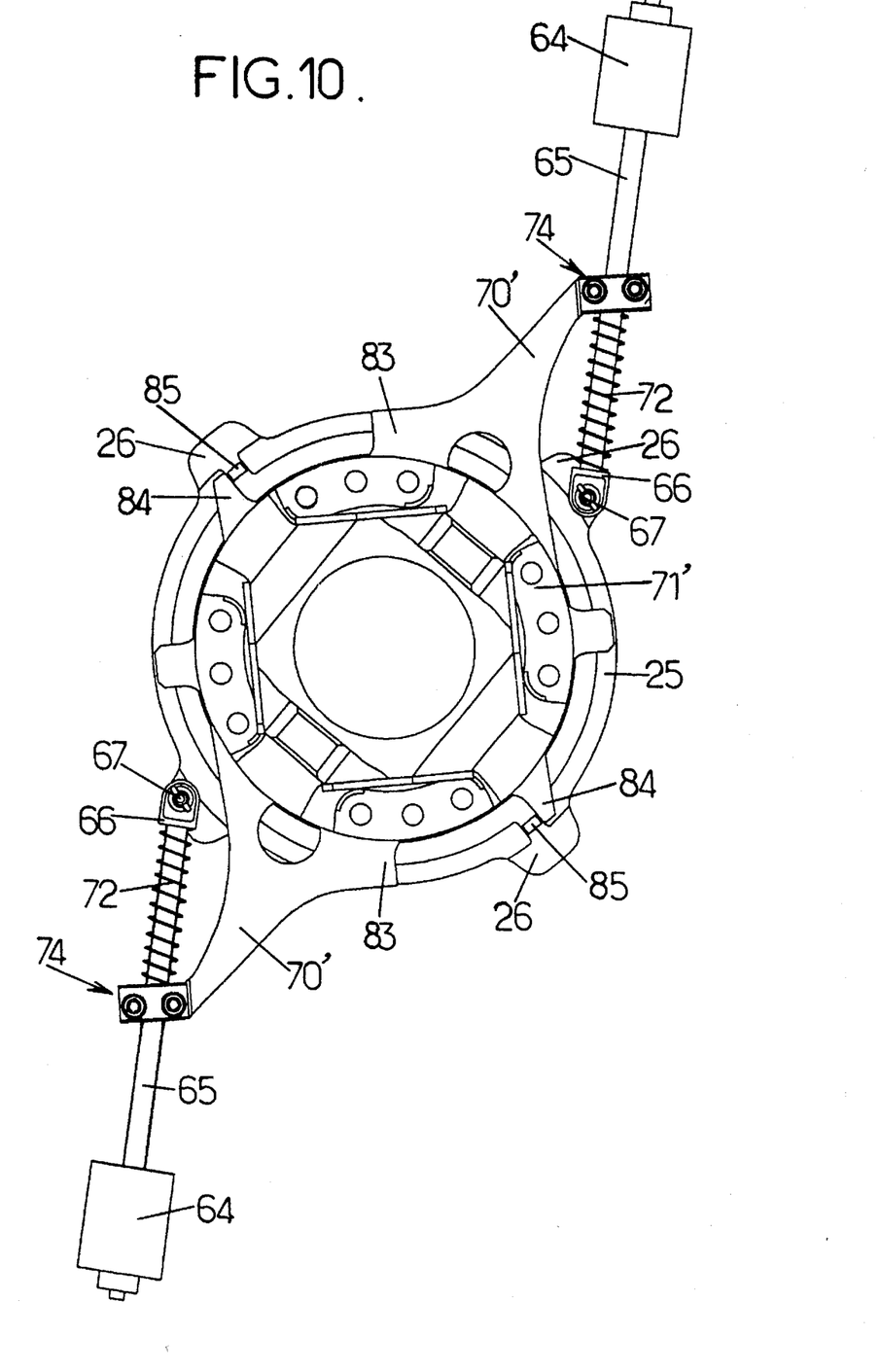
FIG. 10 is a diagrammatic plan view of the alternative of the stops device of FIG. 9, in the "flight" position.

FIGS. 9 and 10 represent respectively in the "ground" and "flight" positions, an alternative to the device of FIGS. 7 and 8, distinguishable therefrom merely by the embodiment of the gliding and pivoting link means consisting of the ball joint 68 in the ball joint socket 69 in the example of FIGS. 7 and 8.

In FIGS. 9 and 10 we therefore find again, in each of the two retraction mechanisms 73, a flyweight 64 at one end of a sliding rod 65 pivoted via its end fitting 66 at its opposite end on a pivot 67 fixed to an upper stop 26 of the rotary ring 25. We also again find a helical compression spring 72 (not represented in FIG. 9, but shown in FIG. 10) wound around the part of the sliding rod 65 between the end fitting 66 of the latter and the gliding and pivoting link 74 fixed to the outer radial end of a radial arm 70' of the plate 71' which, as in the previous examples, holds the ring 25 on its support 28 on the hub.

Figure 11:
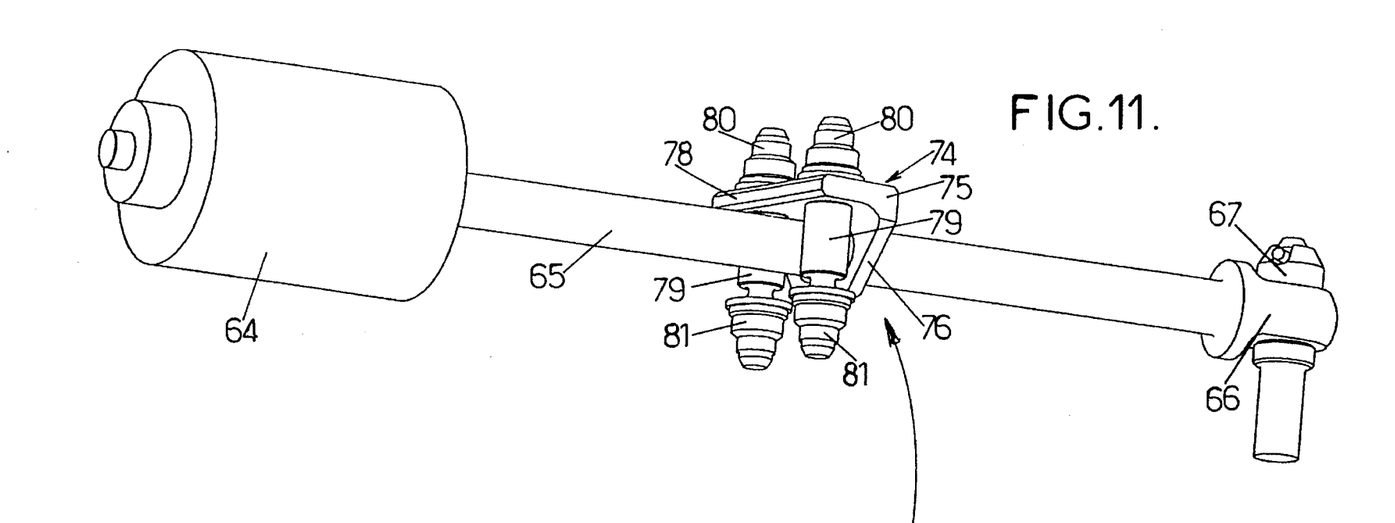
FIG. 11 is a perspective view of a subassembly of the stops device of FIGS. 9 and 10.
Figure 12:
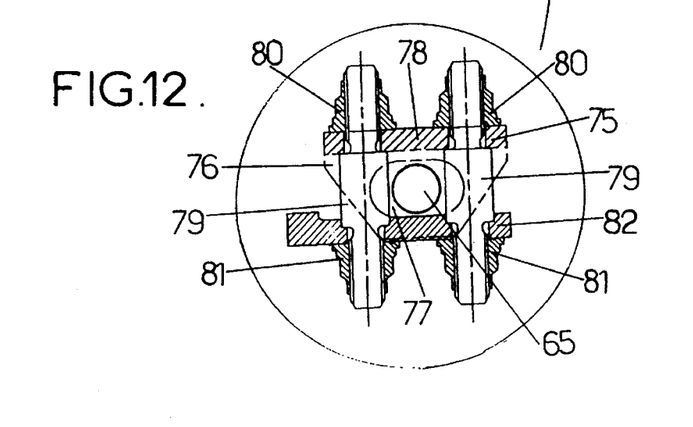
FIG. 12 is a traverse section of the device of FIG. 11.

The structure of the gliding and pivoting link 74, as well as its interaction with the sliding rod 65 are represented in FIGS. 11 and 12. This link 74 is provided with the aid of a steel angle bracket 75, a trapezoidal leg 76 of which displays an oblong slot 77 of major axis substantially parallel to the other, rectangular, leg 78 of the angle bracket 75. The rod 65 passes through the slot 77 with clearance in the direction of the minor axis of this slot, and with much greater clearance in the direction of the major axis, allowing the relative pivotings of the rod 65 and of the angle bracket 75 when changing between the "ground" and "flight" positions. The rod 65 passes not only between the two opposite straight flanks (horizontal in FIG. 12) of the slot 77, but also between two identical mutually parallel cylinders 79 parallel to the minor axis of the slot 77 and fixed, by bolting at 80, onto the leg 78 of the angle bracket 75 and at 81 under a flat aluminium anchoring lug 82 parallel to the leg 78 and secured to the outer radial end of the arm 70'. A link 74 is thus obtained which allows the axial gliding or sliding of the rod 65 in the slot 77 and between the cylinders 79 and also, with clearance, between the leg 78 and the lug 82, as well as the pivoting of this rod 65 with respect to the angle bracket 75 without having any moving or articulated part in this link 74, so that the latter is not sensitive to ice, for example, which may lock up the ball joint 68 of the previous example in its socket 69. The embodiment of FIGS. 9 to 12 is therefore more crude than the previous ones, while not running any risk of jamming and being insensitive to weather conditions (icing-up, sandstorms). In addition, the plate 71' of FIGS. 9 and 10 also exhibits, for each of the two retraction mechanisms 73, two radial rotation stops 83 and 84 corresponding respectively to the stops 47 and 49 of the first example, and interacting with an axial rotation stop 85 of the rotary ring 25, corresponding to the stops 46 and 48 of the first example, for halting the ring 25 respectively in the "ground" position (FIG. 9) and "flight" position (FIG. 10).

In FIG. 9, the anti-cone stops 26 of the rotary ring 25 are represented facing upper bearing shoes 23 fixed, as in the first example of FIGS. 1 to 4, to the upper branch 9a of the inner clevis of a sleeve 5 for linking to each blade, in the same way as in the first example, but the hub 1 has not been represented, since the structure of the hub which can take the stops device of the invention is not limited to that of FIGS. 1 to 4. The stops device of the invention can be mounted on any hinged hub.

In all the examples, the minimum clearance J1 between the anti-cone stop tracks such as 24 in FIGS. 2 and 3 and the anti-cone stops of the hub 1 is obtained by interposing retractable protrusions 26 of the rotary ring 25 in front of these anti-cone stop tracks 24.

As there is no drag and the blades may have any pitch when the rotor is stationary, each flapping mass rests in its natural position on the droop restrainer ring 21, being subjected to its static moment, as explained hereinabove. The flat droop retrainer stop track 20 is therefore normal to the spherical radius of this droop restrainer ring 21 at the point of contact. If a blade is acted upon in terms of drag, owing to the rotation of the blade about its axis of drag Z—Z (see FIG. 2), the point of contact between the droop restrainer ring 21 and the droop restrainer stop track 20 is displaced and, as the distance between the centre Ca of the droop restrainer ring 21 and the centre Cb of the laminated spherical articulation 10 cannot change, this displacement of the point of contact leads to an upwards tilting of the flapping mass about its axis of flap Y-Y and, as the clearance between the anti-cone stops track 24 and the anti-cone stop 26 of the ring 25 is small, simultaneous locking-up in terms of flap and in terms of drag rapidly ensues. The effect of combined flap and drag stops given by the interaction of the anti-cone or upper flap stops of the invention with droop restrainer stops with a droop restrainer ring is all the more pronounced the smaller the clearance J1.

This feature makes it possible to avoid the use of an actuator or specific tooling for blocking these two movements in order to fold the blades.

The retractable anti-cone stops device of the invention therefore displays the following advantages:

it makes it possible to avoid the presence of an electromechanical device or specific tooling for blocking the blades in terms of flap and in terms of drag. While retaining the conventional properties of retractable flap stops it makes it possible, with the rotor stationary, to maintain a minimum clearance in terms of flap, automatic blocking in terms of drag by cooperation with a droop restrainer stop having a droop restrainer ring, great rigidity upon contact with or without impact owing to the monobloc design of the rotary ring, for withstanding the considerable forces of the flapping masses on the hub even in the presence of strong wind, this being true more particularly during automatic or manual folding-up or deployment of the blades, it prevents inadvertent retraction of the anticone stops on the ground since, during stick movements, the anti-cone stop tracks such as 24 cannot drive the ring 25 in rotation in any direction because it is prevented from doing so, on the one hand, by the corresponding rotation stop such as 47 in FIG. 2 and, on the other hand, the frictional force of the track 24 on the ring 25 is less than the return force of the springs added to the frictional forces of the ring 25 pressed against its support 28. Furthermore, in the case of vertical movements, the retractable stops 26 of the ring 25 are not sensitive to the inertial force on the retraction flyweights, it frees up a usable space between the hub 1 and the sleeves 5 of the blades, or between the sleeves 5 themselves or alternatively above the hub 1, depending on the embodiment. This space may be necessary for the passage, for example, of elements of a de-icing device or of actuators required for automatic folding of the blades, it respects the balance of the rotor, owing to its perfect symmetry with respect to the rotor axis A—A, it decreases the number of components by half by comparison with conventional fittings as described in FR 2,434, 079, it is insensitive to the phenomenon of icing-up since, when the rotor is stationary, any ice deposited is broken by the impacts obtained, upon start-up, as soon as the anti-cone stop tracks 24 strike the protrusions 26 of the rotary ring 25 for the first time and, with the rotor turning, if the ring 25 remains locked in the flight position, safety is not compromised, in the event of breakage of a return spring in flight, since each of these is dimensioned to return the rotary ring 25 to the ground position, during deceleration, and in the event of breakage of both springs, since the ring 25 remains retracted during the end of the flight and when coming to a standstill, flight safety is not compromised.

We claim:

1. In combination, a flap stops device for a rotorcraft and a main rotor, said main rotor comprising:

a plurality of blades, each blade being attached to a hub of the rotor by an attachment part, said attachment part being joined to the hub by means for holding and articulating;

said flap stops device comprising for each said blade, a corresponding upper stop mounted so as to move on the hub;

an elastic return means for returning said upper stop to a ground position, wherein each upper stop directly faces and has a clearance away from a stop track of an upper bearing shoe, said upper bearing shoe being mounted on said attachment part of a corresponding blade so as to limit upwards flapping of said blade by contacting said stop track against a corresponding upper stop at rotational speeds of the rotor within a range between zero and below a threshold corresponding to a speed which is sufficient to allow the rotor to be controlled using rotorcraft flight controls;

at least one flyweight mounted so that it can pivot on said hub about a pin which is substantially parallel to an axis of rotation of the rotor and mechanically joined to at least one upper stop so that at rotational speeds of the rotor which are greater than said threshold each flyweight is moved away from said axis of rotation of the rotor by centrifugal force, the upper stops are moved against said elastic return means into a flight position such that said upper stops no longer face said upper bearing shoes of the blades, said blades no longer being limited in terms of upwards flapping by the upper stops, and said upper stops each project outwards from a rotary ring which is substantially coaxial with the hub, said ring being mounted so as to rotate about the axis of rotation of the rotor on an upper part of the hub, and each flyweight being mechanically joined to said ring by means for driving the ring in rotation about the axis of rotation of the rotor from the ground to the flight position of the upper stops when said flyweight is moved away from this axis by centrifugal force, and against the elastic return means which return the ring to the ground position of the upper stops and each flyweight towards the axis of rotation of the rotor.

2. A combination according to claim 6, wherein the upper stops comprise protrusions, equal in number to the blades, in the form of projections from said rotary ring and integral with said rotary ring.

3. A combination according to claim 1, further comprising at least two flyweights, wherein said flyweights, said drive means and said elastic return means are symmetric with respect to the axis of the rotor.

4. A combination according to claim 1, further comprising means for supporting the ring on the hub, wherein the rotary ring and means for supporting the ring on the hub, each has a first rotation stop interacting in a circumferential direction to halt rotation of the ring in the ground position under an action of the elastic return means, and a second rotation stop interacting in the circumferential direction to halt rotation of the ring in the flight position under an action of centrifugal force acting on each flyweight.

5. A combination according to claim 4 wherein the elastic return means comprise at least one helical spring joining a fixed point of the ring to a hub point of said means for supporting the ring on the hub, said hub point being fixed with respect to the hub of the rotor.

6. A combination according to claim 4 wherein said means for supporting the ring on the hub comprise a support of cylindrical shape attached to a top face of the hub, and wherein the ring is kept around a rotation bearing surface formed in an upper part of said support between a removable plate fixed to the support and a radial shoulder thereof, and the support includes between said shoulder and a part for linking to the hub, at least one boss projecting outwards and forming a flight upper flap stop for each blade.

7. A combination according to claim 4 wherein said drive means which joins each flyweight to the rotary ring, further comprise a pinion having a pinion hub from which the flyweight overhangs, said pinion being mounted so as to pivot about said pivot pin linked to said means for supporting the ring on the hub of the rotor, the pinion meshing with toothing on the ring so that pivoting of each flyweight and of the pinion about the pivot pin are simultaneous with rotations of the rotary ring between the ground position and the flight position.

8. A combination according to claim 4 wherein said drive means further comprise a lever with a first and second arm articulated together at a first end of each arm, wherein said first arm, supporting the flyweight at an opposite end, is pivotally mounted between said first end and a second end on a fixed point of the means for supporting the ring on the hub, wherein said second arm is articulated by a second end at a fixed point of the ring so that pivoting of the first arm, moving the flyweight respectively away from or towards the axis of the rotor, corresponds to movement of the second arm and a rotation of the ring on its means for support on the hub between the ground position and the flight position.

9. A combination according to claim 1 wherein said drive means further comprise a rod carrying the flyweight at a first end of said rod being pivotally mounted so as to pivot via a second end on a fixed point of the ring so that said rod can slide between its ends in linking means for providing a pivotal and gliding link formed at a fixed point of means for supporting the ring on the hub, so that any movement of the flyweight under the effect of centrifugal force or of the elastic return means leads, by pulling on said rod, to a rotation of the ring between the ground position and the flight position.

10. A combination according to claim 9 wherein said elastic return means comprise, for each flyweight, a helical compression spring surrounding said rod between said second pivoting end on the ring and said linking means so as to bear against the ring at one spring end and against said means for supporting the ring on the hub at the other spring end.

11. A combination according to claim 9 wherein said linking means comprises a ball joint through which the rod passes in a sliding manner, said ball joint being pivotally held in a ball joint socket of said means for supporting the ring on the hub.

12. A combination according to claim 9 wherein said linking means comprises an angle bracket which includes a first leg which includes an oblong slot through which there passes, with clearance along major and minor axes of the slot, the rod passing between two mutually parallel cylinders parallel to the minor axis of the slot and held on a second leg of the angle bracket by a fastening lug of said means for supporting the ring on the hub, said fastening lug being substantially flat and parallel to the second leg of the angle bracket, and wherein the rod passes with clearance between the second leg of the angle bracket and the fastening lug.

13. A combination according to claim 9 wherein for each flyweight, said linking means is carried at an outer radial end of an arm of a plate for holding the ring on a support, and the second pivoting end of the rod is fitted with a socket end fitting mounted so as to pivot on said pivot pin fixed to said upper stop of the ring.

14. A combination according to claim 1 further comprising a droop restrainer mechanism including, for each blade, a common lower stop formed as a droop restrainer ring and mounted so as to move radially about a shaft of the rotor beneath the hub to which the shaft is rotationally secured, a lower bearing shoe secured to said part for attaching the blade to the hub and a stop track which enables the lower bearing shoe to come into contact with the droop restrainer ring at rotational speeds of the rotor within said range.

15. In combination, a rotorcraft rotor head, and a flaps stops device for a rotorcraft having a main rotor said rotorcraft rotor head comprising a rotor hub rotationally secured to a rotor mast about an axis of rotation of the rotor, and to which each of a plurality of blades of the rotor is joined by an attachment part which is forked and has two branches and by means for holding and articulating on the hub, said holding and articulating means including a laminated spherical bearing incorporated between an outer radial armature and an inner radial armature, said outer radial armature being fixed to said hub, said inner radial armature being fixed to inner radial ends of said two branches of said corresponding forked attachment part, and said laminated spherical bearing being housed between the two branches of the corresponding forked attachment part, so that a center of rotation of said bearing is situated radially outward of said bearing, said forked attachment part of each blade being a substantially radial linking member shaped at its inner radial end into a clevis, the two branches of which are fixed to the inner radial armature of the corresponding holding and articulating means, and shaped at its outer radial end as a clevis for fixing to a root of the corresponding blade using two pins substantially parallel to the axis of rotation of the rotor, and one of which is removable in order to allow the blade to be folded back by pivoting about the other pin;

said flaps stops device comprising for each said blade, a corresponding upper stop mounted so as to move on the hub;

an elastic return means for returning said upper stop to a ground position, wherein each upper stop directly faces and has a clearance away from a stop track of an upper bearing shoe, said upper bearing shoe being mounted on said attachment part of a corresponding blade so as to limit upwards flapping of said blade by contacting said stop track against a corresponding upper stop at rotational speeds of the rotor within a range between zero and below a threshold corresponding to a speed which is sufficient to allow the rotor to be controlled using rotorcraft flight controls; at least one flyweight mounted so that it can pivot on said hub about a pivot pin which is substantially parallel to said axis of rotation of the rotor and mechanically joined to at least one upper stop so that at rotational speeds of the rotor which are greater than said threshold each flyweight is moved away from said axis of rotation of the rotor by centrifugal force, the upper stops are moved against said elastic return means into a flight position such that said upper stops no longer face said upper bearing shoes of the blades, said blades no longer being limited in terms of upwards flapping by the upper stops, and said upper stops each project outwards from a rotary ring which is substantially coaxial with the hub, said ring being mounted so as to rotate about the axis of rotation of the rotor on an upper part of the hub, and each flyweight being mechanically joined to said ring by means for driving the ring in rotation about the axis of the rotor from the ground to the flight position of the upper stops when said flyweight is moved away from this axis by centrifugal force, and against the elastic return means which return the ring to the ground position of the upper stops and each flyweight towards the axis of the rotor.

* * * * *